Figure 1:
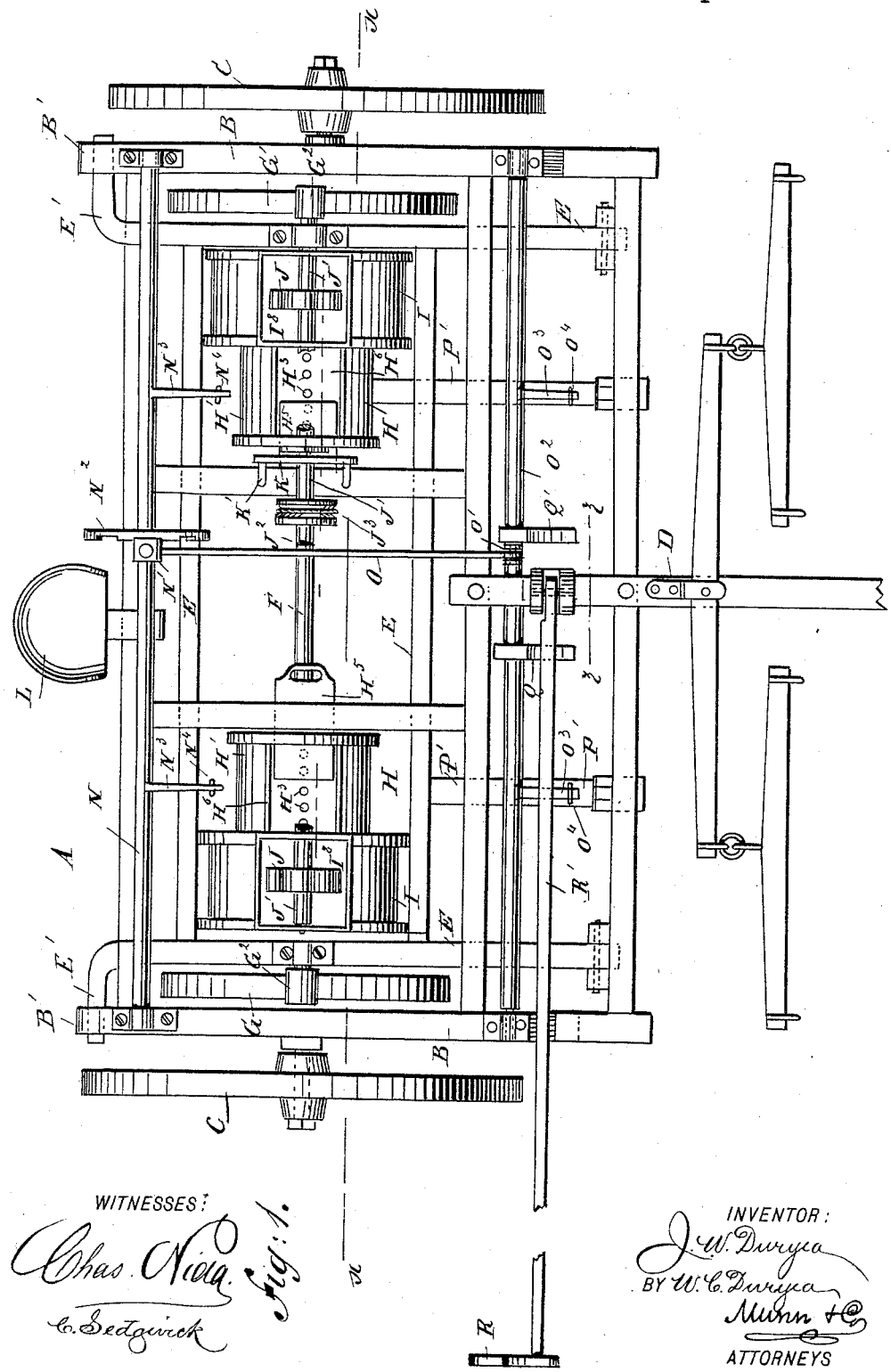

(No Model.) 2 Sheets—Sheet 1.
J. W. & W. C. DURYEA.
CORN PLANTER AND FERTILIZER DISTRIBUTER.

No. 436,649. Patented Sept. 16, 1890.

WITNESSES:
Chas. Nida.
C. Sedgwick.

INVENTOR:
J. W. Duryea
BY W. C. Duryea
Munn & Co.
ATTORNEYS

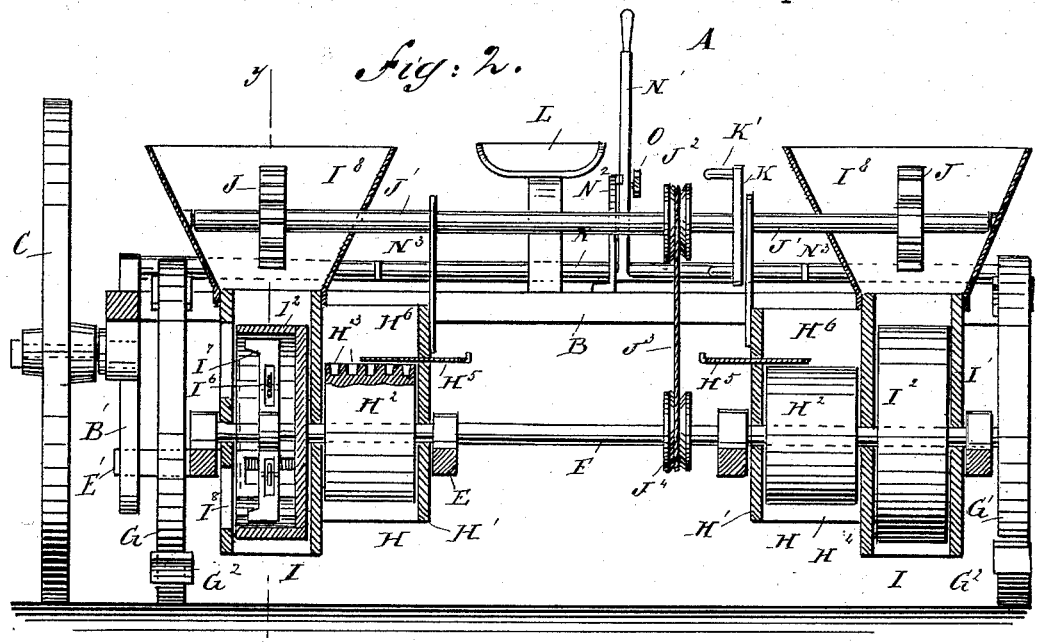
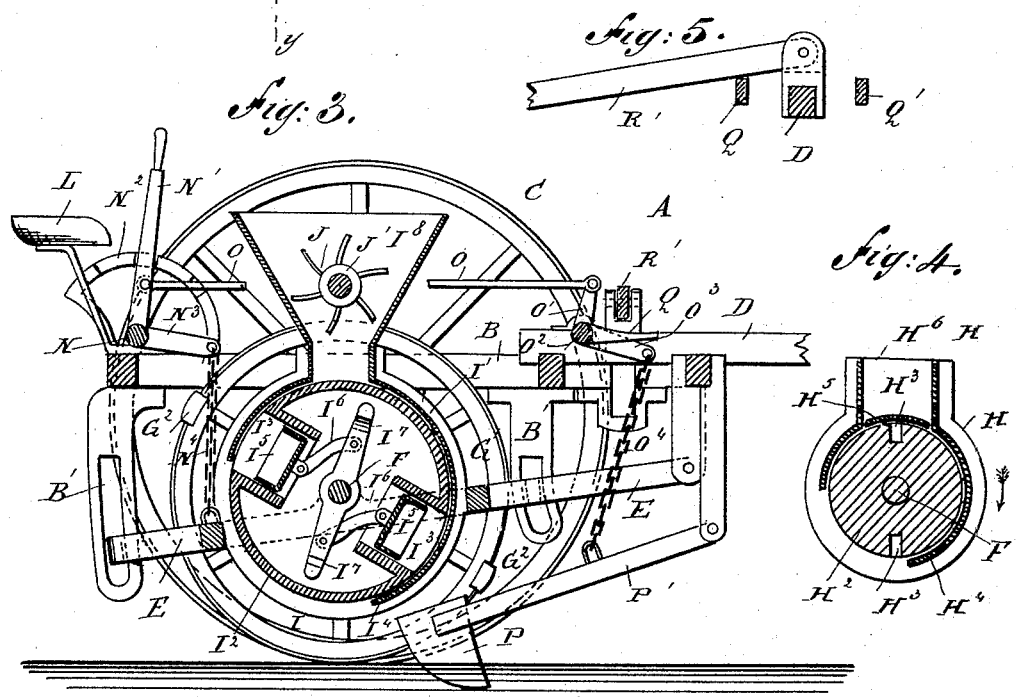

UNITED STATES PATENT OFFICE.

JACOB WEAST DURYEA AND WILLIAM C. DURYEA, OF BLAWENBURG, NEW JERSEY.

CORN-PLANTER AND FERTILIZER-DISTRIBUTER.

SPECIFICATION forming part of Letters Patent No. 436,649, dated September 16, 1890.

Application filed March 13, 1890. Serial No. 343,693. (No model.)

*To all whom it may concern:*

Be it known that we, JACOB WEAST DURYEA and WILLIAM C. DURYEA, both of Blawenburg, in the county of Somerset and State of New Jersey, have invented a new and Improved Corn-Planter and Fertilizer-Distributer, of which the following is a full, clear, and exact description.

The object of the invention is to provide a new and improved corn-planter and fertilizer-distributer which is simple and durable in construction, very effective in operation, and permits an accurate check-planting of the seed and marking of the hills.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a plan view of the improvement. Fig. 2 is a transverse section of the same on the line $x\ x$ of Fig. 1, one end being broken away. Fig. 3 is a sectional side elevation of the same on the line $y\ y$ of Fig. 2. Fig. 4 is a sectional side elevation of the seed-box. Fig. 5 is a sectional end view of the marking device on the line $z\ z$ of Fig. 1, and Fig. 6 is a plan view of the seed-plow.

The improved corn-planter and fertilizer-distributer A is provided with a main frame B, mounted on the usual wheels C and provided at its front end with a tongue D, to which the animals for pulling the machine over the field are hitched.

To the front end of the main frame B and on the under side is pivoted an auxiliary frame E, provided with projecting arms E', fitting into similar slotted segments B', secured to the under side at the rear end of the main frame and serving to guide the auxiliary frame when swinging the same up and down, as hereinafter more fully described.

In the auxiliary frame E is mounted to turn in suitable bearings the transversely-extending shaft F, which terminates near the sides of the main frame B and carries on each outer end a marking-wheel G or G', adapted to travel on the ground when the auxiliary frame E is in its lowermost position, so that the said wheels turn when the machine is moved forward to impart a rotary motion to the shaft F. Each of the wheels G or G' is provided at opposite points in the periphery with projections $G^2$, adapted to mark the hill into which seed has been dropped, as hereinafter more fully described.

On the shaft F are held one or two seed-dropping mechanisms H and corresponding fertilizer-distributers I, located suitable distances apart, according to the space between the rows of the corn to be planted.

As the two seed-dropping machines and fertilizer-distributers H and I, respectively, are the same in construction and are held on the auxiliary frame E and both operated from the transverse shaft F, it suffices to describe only one, the construction and operation being exactly the same in both and simultaneous.

The seed-dropping device H is provided with a cylindrical casing H', in which is mounted to turn a seed-wheel $H^2$, secured on the shaft F and provided at two opposite points in its periphery with a row of transversely-extending apertures $H^3$, which when in their lowermost position, as shown in Fig. 4, drop the seed through an opening in the rim $H^4$ of the cylindrical casing H', the rows of apertures or recesses $H^3$ being arranged in line with the projections $G^2$ of the wheels G and G', respectively, so that at the moment the dropping of the seed takes place one of the projections $G^2$ is in its lowermost position and makes an indentation in the ground, thus marking the hill into which the seed has been dropped.

In order to drop more or less corn at a time in one set of recesses or apertures $H^3$, the latter can be partly covered up by a transversely-extending slide $H^5$, fitted to slide in one side of the cylindrical casing H'. Above the slide $H^5$ is arranged a hopper $H^6$, into which the corn to be planted is placed, so that the recesses $H^3$, whenever they pass through the hopper, fill themselves with corn and cut off when they pass into the circular rim H⁴ of the casing to finally drop the corn at the opening in the bottom of the rim, as previously described. By adjusting the slide H⁵ one, two, or more kernels of corn can be dropped into one hill.

Each of the fertilizer-distributers I is provided with a cylindrical casing I' on the auxiliary frame E, and in which is mounted to turn the flanged fertilizer-wheel I², provided with oppositely-arranged recesses I³, opening onto the rim of the wheel and adapted to receive the fertilizer and to drop the same when in a lowermost position—that is, when passing into an opening formed in the bottom of the rim I⁴ of the said cylindrical casing I'. The recesses I³ are arranged in line with the recesses H³ of the seed-wheel H², and also in line with the projections G² of the wheels G and G', respectively, so that the seed and the fertilizer are dropped at the same time and the hills containing both are marked by the lowermost projections G² of the said wheels G and G'.

In order to regulate the amount of fertilizer to be dropped into each hill of corn the bottom of each recess I³ is made in the shape of a cup I⁵, held to slide in the recess I³, so as to enlarge or diminish the size of the recess to receive more or less fertilizer. In order to set the cup I⁵ of each recess to the proper place the under side of the cup is pivotally connected by a link I⁶ with a lever I⁷, fulcrumed loosely on the shaft F and extending within the flange of the wheel I² opposite openings I⁹ in the casing I', as is plainly shown in Figs. 2 and 3. By turning the lever I⁷ on the shaft F the links I⁶ move the cups I⁵ farther out of or into the recesses I³ of the wheel I², so that the size of the recesses for receiving the fertilizer is increased or diminished, according to the direction in which the lever I⁷ is moved. The recesses I³ are filled with fertilizer from the hopper I⁸, set on top in the rim I⁴ of the cylindrical casing I', so that when the wheel I² turns with the shaft F as each recess I³ passes the lower end of the hopper I⁸ the fertilizer slips from the hopper into the recess to fill the same, and then on the further movement of the wheel I² the recess is cut off by traveling around the front part of the rim I² of the cylindrical casing.

In order to agitate the fertilizer in both hoppers I⁸ agitating-wheels J are provided having a series of spokes and secured on a transversely-extending shaft J', mounted to turn in suitable bearings formed in the sides of the hoppers I⁸, and also in bearings secured on one side of the cylindrical casing H' of the seed-dropping mechanism. On the shaft J' is secured a pulley J², over which passes a belt J³, also passing over a pulley J⁴, secured on the shaft F, so that the latter, when rotated by the wheels G and G' traveling over the ground, imparts a rotary motion to the shaft J', whereby the wheels J agitate the fertilizer contained in the hoppers I⁸.

In order to set the wheels G and G', and consequently the seed-dropping wheel H² and the fertilizer-wheel I², to the proper place when starting a new row, a lever K is provided, which is secured on the shaft J' and has suitable handles K', within convenient reach of the operator sitting on the seat L, secured to the main frame A in the middle of its rear end.

In order to raise or lower the auxiliary frame E and its contents the following device is provided: A shaft N is mounted to turn in suitable bearings in the rear part of the main frame B, extends transversely, and is provided with an upwardly-extending lever N', arranged within convenient reach of the operator seated on the seat L. A notched segment N² is secured to the main frame B and serves to lock the said lever N' into any desired position. On the shaft N are also secured a number of forwardly-extending arms N³, each connected by a chain N⁴ with the rear end of the pivoted auxiliary frame E, so that when the operator moves the lever N' forward or backward the shaft N is turned, and the arms N³ by the chains N⁴ cause an upward or downward swinging of the auxiliary frame E. The lever N' is also pivotally connected by a forwardly-extending link O with an arm O', secured on a transversely-extending shaft O², mounted to turn in suitable bearings on front end of the main frame B. On this shaft O² are arranged forwardly-extending arms O³, connected by chains O⁴ with arms P', pivoted to the front end of the main frame B and extending downward and rearward, carrying at their inner ends a plow P, arranged in front of the seed-dropping mechanism H and serving to form a furrow for the seed dropped by the seed-dropping mechanism. When the lever N' is moved, as previously described, for swinging the auxiliary frame E, then at the same time the plows P are raised or lowered—that is, moved into or out of the ground simultaneously with the swinging of the auxiliary frame E. On the transversely-extending shaft O² are also secured forwardly-extending arms Q and Q', arranged on opposite sides of the tongue D and adapted to support alternately the marking-arm R', pivoted on top of the tongue D and carrying at its outer end the usual marker R. When the operator imparts a sudden rearward motion to the lever N', the shaft O² is suddenly turned, and the respective arm Q or Q' works against the under side of the marking-arm R', so that the same swings over to the other side to be again treated in the same manner at the next turning of the row.

The operation is as follows: When the machine is moved about from place to place, the operator moves the lever N' into the rearmost position on top of the segment N², so that the auxiliary frame E is swung into an uppermost position, whereby the wheels G and G' are taken off the ground. The movement of the lever N' into the rearward notch of the segment N² also raises the plows P, so that the latter are above the ground. When the operator commences operations in the field, the lever N' is moved to the front of the top of the segment N², so that the frame E hangs in its lowermost position, and the wheels G G' travel on the ground with the main wheel C of the main frame. Now, when the machine is drawn across the field, the wheels G and G' rotate and impart a rotary motion to the shaft F, which carries the seed-wheels H² and the fertilizer-wheels I². At the same time a rotary motion is imparted to the shaft J', carrying the agitating-wheels J in the two hoppers I⁸, the hoppers H⁶ and I⁸ having previously been filled with the seed and the fertilizer, respectively, so that the rotary motion of the shaft F causes the seed-wheels H to carry seed in each set of recesses H³ to the ground, as previously described, into the furrows made by the plows P. The dropping of the seed, as well as that of the fertilizer, takes place at every half-revolution of the wheels G and G', and the hills in which the seed and fertilizer are dropped are marked by the projections G², formed on the rims of the wheels G and G'. The amount of seed dropped at every half-revolution is regulated by adjusting the slide H⁵, and the amount of fertilizer dropped is regulated by adjusting the lever I⁷, as previously described. Thus it will be seen that the planting of the seed takes place at equal distances. The amount of seed dropped in each hill can be regulated, and the amount of fertilizer deposited alongside of each hill can also be determined. The line of travel of the machine is indicated by the marker R, so that the operator when commencing a new row can drive the machine along the line previously marked by the marker R, and at the same time when starting the new row he can set the wheels G and G', so that the projections G² are in line with the hills previously made. This is done by the operator in turning from the end of one row to the commencement of the other row by raising the auxiliary frame E, and then when starting into the new row he works the lever K, so as to turn the shaft J' and by the pulleys J² J⁴ and the belt J³ and the shaft F until the wheels G and G' stand in such a position that their projections G² are in line with the previously-marked hills. The operator then again moves the lever N' forward to swing the auxiliary frame E to the ground, so that the wheels G travel on the ground and are pressed onto the same by the weight of the auxiliary frame and its contents. The marker R is changed from one side to the other, as previously described, from the driver's seat by operating the lever N' suddenly.

Having thus fully described my invention, I claim as new and desire to secure by Letters Patent—

1. In a corn-planter and fertilizer-distributer, the combination, with a shaft mounted to turn, of a fertilizer-distributer comprising a cylindrical casing having in the bottom of its rim an opening, a fertilizer-wheel secured on the said shaft and mounted to turn in the said casing and provided with openings for the reception of the fertilizer, a hopper held on the top of the said cylindrical casing and opening onto the rim of the said fertilizer-wheel, movable bottoms held in the recesses of the said fertilizer-wheel, a lever mounted between its ends to turn loosely on the said shaft, and links connecting the said lever at opposite sides of its center with the said movable bottoms, one side of the cylindrical casing and fertilizer-wheel being open to permit access to the said lever, substantially as shown and described.

2. In a corn-planter and fertilizer-distributer, the combination, with a main frame, of an auxiliary frame pivoted thereon, a transverse shaft mounted to turn in the said auxiliary frame, marking-wheels secured on the said transverse shaft, a second shaft supported on the said auxiliary frame, pulleys and belts for connecting the said two shafts with each other, a lever held on the said second shaft for turning the same, and a second lever pivoted on the main frame and serving to raise the said auxiliary frame to enable the operator to turn the said first-named lever to change the position of the marking-wheels, substantially as shown and described.

3. The combination, with the main frame B, having drive-wheels C, a transverse shaft N at its rear end provided with arm N³ and a lever N', adjacent to the driver's seat, and a transverse shaft O² at the front end of the frame provided with an arm O³, and an upwardly-projecting arm O', connected to lever N by the rod O, of the vertically-swinging frame E, hinged at its forward end to the forward end of frame B and carrying marking-wheels and seed-dropping mechanism, a connection N⁴, connecting the rear end of frame E with arm N³, a furrow-opener P', hinged to the frame B below frame E, and a connection O⁴ between said furrow-opener and the arm O³, substantially as set forth.

4. The combination, with a planter having a transverse rock-shaft O² thereon provided with two arms Q Q and an operating-lever, of marker R, pivoted at its inner end to the frame between the two arms Q Q to swing transversely across them, whereby by suddenly rocking the said shaft one of its arms will throw the marker to the opposite side of the frame and across the other arm Q, substantially as set forth.

5. A planter comprising the main frame having the drive-wheels, front and rear rock-shafts O² N, arms O³ O³ O' and Q Q on the shaft O², arms N³ and lever N' on the shaft N, rod O, connecting said shafts, the frame E, carrying the seed-dropping mechanism and hinged at its forward end to frame B and connected by chains $N^4$ at its rear end to arms $N^3$, the furrow-opener P', hinged to the front end of the frame B below frame E and connected by chains $O^4$ to arms $O^3$, and the transversely-swinging marker R, pivoted to frame between the arms Q Q, substantially as set forth.

JACOB WEAST DURYEA.
WILLIAM C. DURYEA.

Witnesses:
ALEXANDER D. DURYEE,
CHAS. H. BULL.